Dec. 23, 1930.  F. W. DANAT  1,785,891
VENTILATOR FOR AUTOMOBILES
Filed Nov. 18, 1929
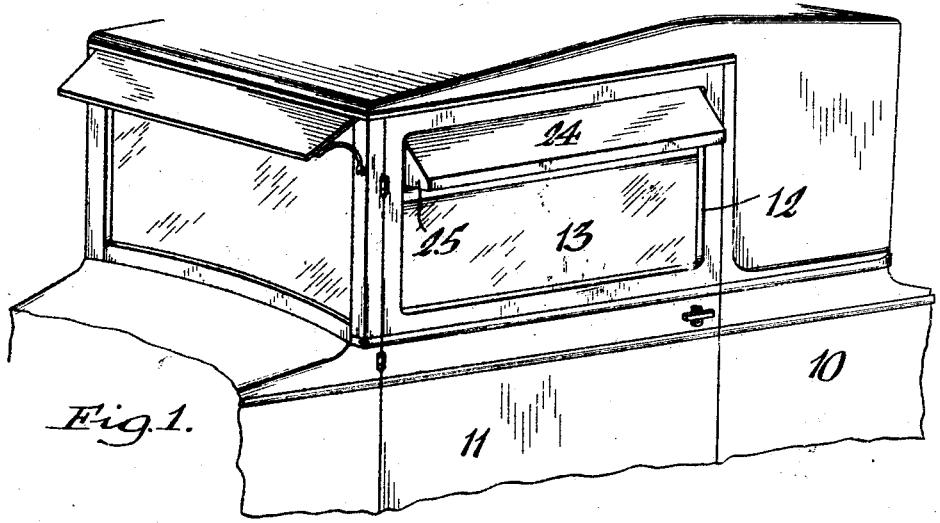
Fig. 1.
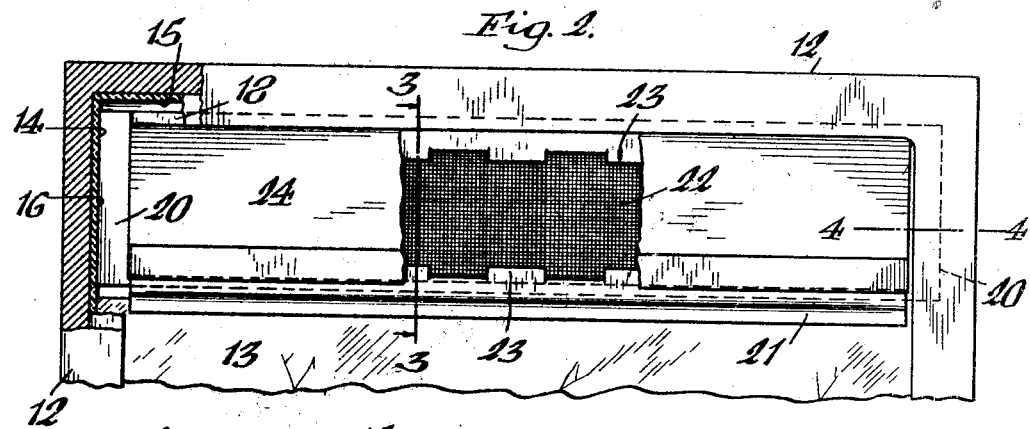
Fig. 2.
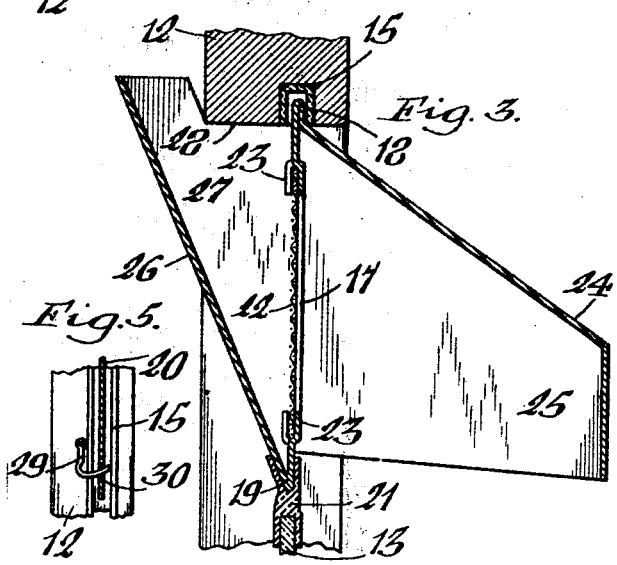
Fig. 3.
Fig. 5.
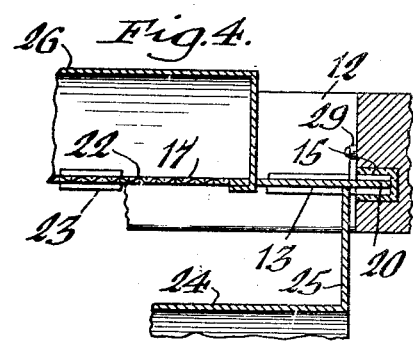
Fig. 4.
Inventor,
Fred W. Danat,
by Walter P. Geyer
Attorney.

Patented Dec. 23, 1930

1,785,891

UNITED STATES PATENT OFFICE

FRED W. DANAT, OF BUFFALO, NEW YORK

VENTILATOR FOR AUTOMOBILES

Application filed November 18, 1929. Serial No. 407,809.

This invention relates to improvements in ventilators of the type which are designed for use in the window and door openings of automobiles.

One of its objects is the provision of a ventilator of this character which is simple, compact and inexpensive in construction, which is neat in appearance, and which is so designed that it can be readily applied to and removed from the window opening and at the same time be firmly held therein against rattling.

Another object of the invention is to provide a ventilator which will not only afford ventilation without objectionable drafts and without rain, snow and dust gaining access to the interior of the vehicle, but which will also serve as a sun visor or sun shade.

In the accompanying drawings:—

Figure 1 is a fragmentary perspective view of an automobile body showing my improved ventilator applied thereto. Figure 2 is an enlarged fragmentary face view of an automobile window, partly in section, showing the ventilator in place therein. Figure 3 is an enlarged transverse section taken on line 3—3, Figure 2. Figure 4 is a fragmentary horizontal section on line 4—4, Figure 2.

Similar characters of reference indicate corresponding parts throughout the several views.

Referring now to the drawings, 10 indicates the body of the vehicle, 11 the door thereof having a window frame 12 to receive the vertically sliding window pane 13 which is operated in the usual and well known manner from the interior of the vehicle. As seen in Figure 2, the window pane is guided at its sides in grooves 14 in the window frame and the top of the latter has a groove 15 for receiving the upper edge of the window pane when the pane is in its closed position. These guide-grooves may be fitted with suitable packing or cushioning strips 16.

The improved ventilator is adapted to be removably fitted in the window-opening, when the pane 13 is partially lowered, between the latter and the top edge of the frame 12. It preferably consists of an attachment constructed of sheet metal and having a central panel or partition 17 terminating at its upper and lower ends in attaching folds 18 and 19, respectively, and at its side edges in attaching flanges 20, 20. The upper attaching fold 18 is adapted to be fitted in the corresponding window-groove 15 while the lower fold 19 has a channeled gripping strip 21, of rubber or like material, secured thereto for engagement with the top edge of the window pane, as shown in Figure 3. The side flanges 20 are adapted to be fitted in the corresponding side grooves 14 of the window frame to reliably hold the ventilator against lateral displacement, its clamped position between the pane and the top of the window frame effectually holding it against displacement vertically. In practice, the attaching flanges 20 are preferably made of a maximum length to render the ventilator attachment applicable to windows of different widths, it merely being necessary to cut the flanges shorter for windows of smaller widths. Fitted in an opening extending substantially the full length of the panel 17 is a screen 22, the same being held in place by tongues 23 struck alternately inwardly and outwardly from the marginal edge of the panel-opening so as to engage the opposite marginal edges of the screen in the manner shown in Figures 2 and 3.

Depending from the upper fold or attaching edge of the panel 17 and disposed at its inlet or outer side is a hood or shield 24 for preventing rain and snow from driving into the car through the ventilator and also functioning as a sun visor or shade in protecting the occupants of the car from objectionable rays of the sun. At its ends the hood may be closed by walls 25 which may be formed integral therewith.

Extending upwardly from the lower edge of the panel 17 and into the interior of the vehicle-body is a deflecting wall 26 which acts to direct the incoming air toward the roof of the body. At its ends this deflecting wall has outwardly-directed attaching flanges 27 which may be suitably fastened to the panel 17 and whose upper edges have notches 28 therein for engaging the adjoining portion of the window-frame, as seen in Figure 3, and assist in holding the ventilator in place in the window.

By constructing the ventilator in this manner, a rigid structure is formed which may be stamped or otherwise produced from one sheet of metal, with the exception of the screen, which is renewable. The disposition of the hood 24 and deflector 26 is such that the air is introduced at the lower side of the hood and discharged at the top of the deflector.

If desired, means may be employed for temporarily holding the ventilator in place within the frame grooves, and to this end I employ hooks 29 or like elements which may be secured to the window frame 12 and engage openings 30 in the contiguous portions of the ventilator.

While manifestly simple, compact and inexpensive in construction, this improved ventilator may be readily applied and removed; its construction is such that it affords effective ventilation without creating drafts and without danger of dust, rain and snow being driven into the car-body. Furthermore, it is neat and attractive in appearance, it affords a sun shield, and does not in any way interfere with the opening and closing movements of the door.

I claim as my invention:—

1. A ventilator for automobiles, comprising a vented panel adapted for insertion between the window frame and the opposing top edge of the sliding window thereof, said panel having attaching flanges at its top and sides for engagement with the window-receiving grooves of the frame, means at the lower edge of the panel for gripping the top edge of the sliding window, and members projecting from the upper and lower edges of said panel in spaced overlying relation thereto and on opposite sides thereof.

2. A ventilator for automobiles, comprising a vented panel adapted for insertion between the window frame and the opposing top edge of the sliding window thereof, said panel having attaching flanges at its top and sides for engagement with the window-receiving grooves of the frame, means at the lower edge of the panel for gripping the top edge of the sliding window, and members projecting from the upper and lower edges of said panel in spaced overlying relation thereto and on opposite sides thereof, one of said members being inclined downwardly and forming a protective covering for the vented panel and the other being inclined upwardly and forming a deflector for the ventilated air delivered to the automobile body.

3. A ventilator for automobiles, comprising a vented panel adapted for insertion between the window frame and the opposing top edge of the sliding window thereof, and reversely bent folds at the upper and lower edges of said panel, the upper fold terminating in an outwardly-facing wall overhanging the vented panel and spaced therefrom at its lower end to form an air inlet, and the lower fold terminating in an inwardly-facing wall inclined upwardly to direct the air in a corresponding direction.

4. A ventilator for automobiles, comprising a central panel for the passage of air therethrough and adapted for insertion between the window frame and the top edge of the sliding window thereof, said panel having attaching flanges along its top and side edges for engaging the window-receiving grooves of the frame, means at the lower edge of the panel for engaging the top edge of the sliding window, and integrally connected members extending in opposite directions from the upper and lower edges of said panel, one of said members overhanging the outer side of the panel and spaced therefrom at its lower end and the other member extending across the inner side of the panel and spaced therefrom at its upper end.

FRED W. DANAT.